United States Patent
Hashimoto (10) Patent No.: US 10,186,969 B2
(45) Date of Patent: Jan. 22, 2019

(54) SEMICONDUCTOR DEVICE

(71) Applicant: RENESAS ELECTRONICS CORPORATION, Tokyo (JP)

(72) Inventor: Kohei Hashimoto, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/655,799

(22) Filed: Jul. 20, 2017

(65) Prior Publication Data

US 2018/0026541 A1    Jan. 25, 2018

(30) Foreign Application Priority Data

Jul. 21, 2016    (JP) .................................. 2016-143470

(51) Int. Cl.
*G05F 1/46* (2006.01)
*G05F 1/56* (2006.01)
*G05F 1/575* (2006.01)
*H02M 3/158* (2006.01)

(52) U.S. Cl.
CPC .............. *H02M 3/158* (2013.01); *G05F 1/56* (2013.01); *G05F 1/575* (2013.01)

(58) Field of Classification Search
CPC . G05F 1/461; G05F 1/462; G05F 1/56; G05F 1/575
See application file for complete search history.

(56) References Cited

U.S. PATENT DOCUMENTS

| | | | | |
|---|---|---|---|---|
| 6,650,173 | B1* | 11/2003 | Khouri ................... | G11C 5/147 327/538 |
| 8,786,358 | B2* | 7/2014 | Endo ....................... | G05F 3/245 327/513 |
| 2007/0247133 | A1* | 10/2007 | Isobe ..................... | G11C 5/147 323/312 |
| 2007/0296392 | A1* | 12/2007 | Chen ........................ | G05F 3/30 323/313 |
| 2009/0045796 | A1* | 2/2009 | Kang ...................... | G05F 1/575 323/318 |
| 2009/0201067 | A1* | 8/2009 | Haneda ..................... | G05F 3/30 327/306 |

(Continued)

FOREIGN PATENT DOCUMENTS

JP    2001-175802 A    6/2001

*Primary Examiner* — Timothy J Dole
*Assistant Examiner* — Sisay G Tiku
(74) *Attorney, Agent, or Firm* — McDermott Will & Emery LLP (57) ABSTRACT

There is to provide a semiconductor device capable of activating a circuit quickly, operating with a lower power consumption in a steady state, and coping with the dispersion of the elements. The semiconductor device includes an amplifier coupled to a power voltage, to output a voltage based on a reference voltage and a voltage of a negative feedback node, to an output node; and a voltage divider coupled to the output node, to output the divided voltage to the negative feedback node. The voltage divider includes first and second voltage dividing paths with different resistance, a first switching circuit coupled to the first and the second voltage dividing paths, in a dividing ratio adjustable way, and a second switching circuit for controlling the first and the second voltage dividing paths.

11 Claims, 7 Drawing Sheets

(56) References Cited

U.S. PATENT DOCUMENTS

| | | | |
|---|---|---|---|
| 2011/0248688 A1* | 10/2011 | Iacob | G05F 1/575 323/234 |
| 2012/0112725 A1* | 5/2012 | Li | G05F 1/575 323/297 |
| 2012/0249114 A1* | 10/2012 | Sako | G05F 1/561 323/312 |
| 2015/0084609 A1* | 3/2015 | Pons | G05F 1/575 323/280 |
| 2016/0320783 A1* | 11/2016 | Yoshii | G05F 1/575 |
| 2017/0052552 A1* | 2/2017 | Mahmoudi | G05F 1/575 |

* cited by examiner

SEMICONDUCTOR DEVICE

CROSS-REFERENCE TO RELATED APPLICATIONS

The disclosure of Japanese Patent Application No. 2016-143470 filed on Jul. 21, 2016 including the specification, drawings and abstract is incorporated herein by reference in its entirety.

BACKGROUND

This disclosure relates to a semiconductor device and particularly, to a semiconductor device having an amplifier.

Generally, quick circuit activation is required of a semiconductor device and a current increase can speed up the activation. In a steady state after the activation, however, the above current flows, hence to increase the power consumption. On the contrary, when the current in the steady state is tried to narrow, the current at the activation is narrowed; therefore, the quick circuit activation cannot be achieved, in the contradicting properties.

In Japanese Unexamined Patent Application Publication No. 2001-175802, there is proposed a method of switching a current flow amount after a predetermined time, hence to speed up and increase power consumption.

Further, there is a possibility of fluctuation in the amplifier output because of dispersion of elements forming a semiconductor device; even if the elements are dispersed, the amplifier output has to be suppressed from the fluctuation.

This disclosure is made in order to solve the above problems, and it is to provide a semiconductor device capable of activating a circuit quickly as well as operating with a lower power consumption in the steady state, and coping with the element dispersion.

Other objects and novel characteristics will be apparent from the description of the specification and the attached drawings.

According to one embodiment, a semiconductor device includes an amplifier coupled to a power voltage, to output a voltage based on a reference voltage and a voltage of a negative feedback node, to an output node, and a voltage divider coupled to the output node, to output divided voltage to the negative feedback node. The voltage divider includes first and second voltage dividing paths with different resistance, a first switching circuit coupled to the first and the second voltage dividing paths, in a dividing ratio adjustable way, and a second switching circuit for controlling the first and the second voltage dividing paths.

According to one embodiment, the semiconductor device includes a first switching circuit capable of adjusting the dividing ratio and a second switching circuit for controlling the first and the second voltage dividing paths, which makes it possible to adjust the current amount while coping with the dispersion of the elements.

DETAILED DESCRIPTION

Embodiments will be described in details with reference to the drawings. The same reference numerals are attached to the same or the corresponding portions and their description is not repeated.

First Embodiment

Figure 1:
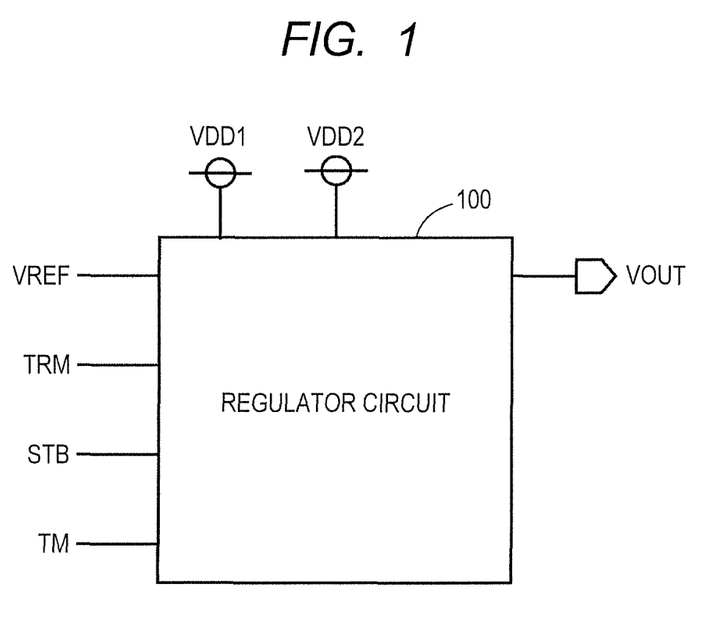
FIG. 1 is a view for use in describing a structure of a semiconductor device according to a first embodiment.

FIG. 1 is a view for use in describing the structure of a semiconductor device according to a first embodiment.

As illustrated in FIG. 1, a regulator circuit 100 as a semiconductor device will be described in this example.

Upon receipt of power voltages VDD1 and VDD2, the regulator circuit 100 supplies a predetermined voltage as the output based on a comparison with a reference voltage VREF. In this example, the power voltage VDD1 is set at a higher voltage than the power voltage VDD2. As one example, the power voltage VDD1 is set at 3.3 V and the power voltage VDD2 is set at 1.5 V.

The regulator circuit 100 receives the reference voltage VREF, a trimming signal TRM, a standby standby signal STB, and a timing signal TM.

Figure 2:
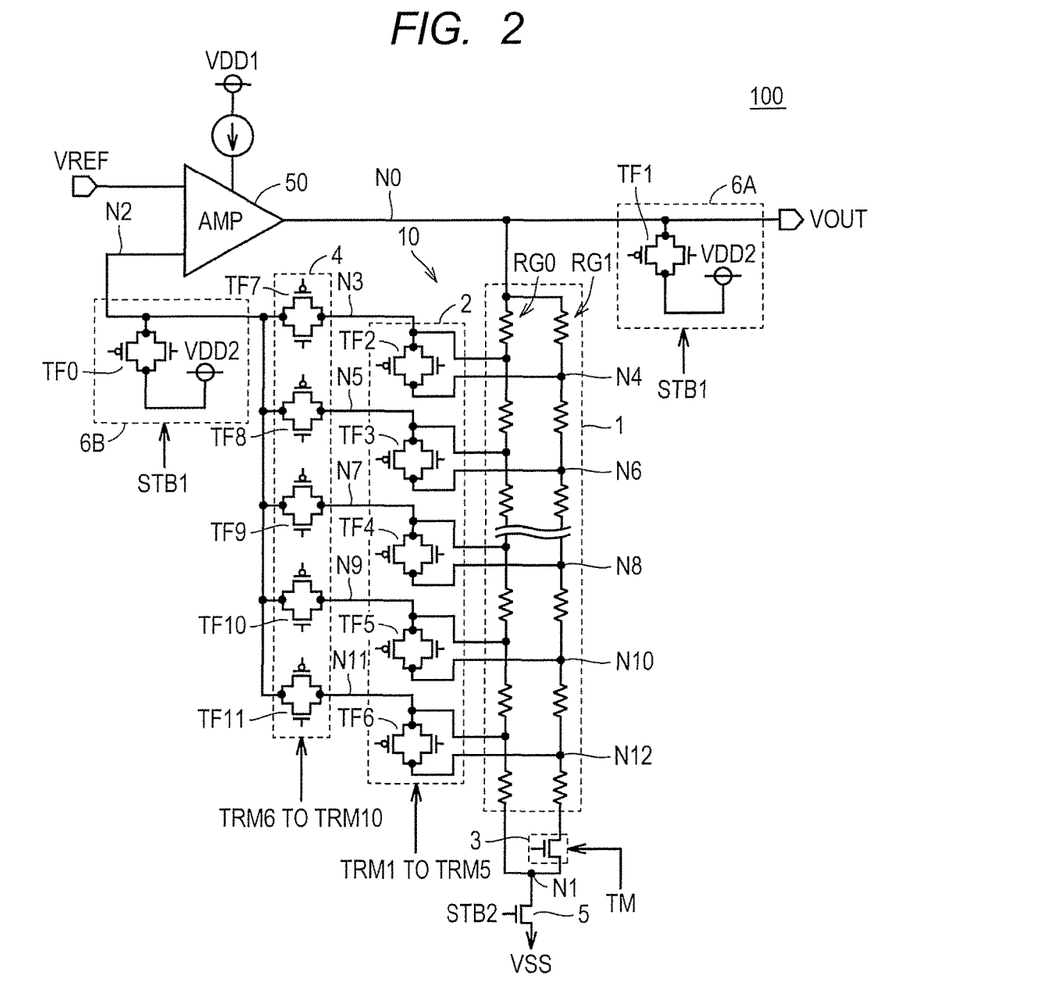
FIG. 2 is a circuit diagram of a regulator circuit 100 according to the first embodiment.

FIG. 2 is a circuit diagram of a regulator circuit 100 according to the first embodiment.

As illustrated in FIG. 2, the regulator circuit 100 includes an amplifier (AMP) 50, a voltage divider 10, and standby setting circuits 6A and 6B.

The amplifier 50 outputs a voltage amplified based on a comparison between the reference voltage VREF and the voltage of a negative feedback node N2 as an output voltage VOUT from a node N0, with the power voltage VDD1 as the operation power.

The voltage divider 10 includes a resistor unit 1 forming a voltage dividing path, switches 3 and 5, and switching groups 2 and 4.

The voltage divider 10 is coupled to the negative feedback node N2 and outputs the divided voltage obtained by dividing the amplified voltage to the negative feedback node N2.

The resistor unit 1 includes a plurality of resistor elements. In the example, the resistor unit 1 includes resistor groups RG0 and RG1 each having a plurality of resistor elements coupled in series. The resistor group RG0 forms a first voltage dividing path. The resistor group RG1 forms a second voltage dividing path. The resistor group RG0 has a higher resistance than the resistor group RG1. Therefore, the current amount flowing in the resistor group RG0 is less than the current amount flowing in the resistor group RG1. In this example, two voltage dividing paths will be described; however, it is not restricted to the above but a plurality of voltage dividing paths may be provided.

The resistor group RG0 is provided between the node N0 and a node N1. The resistor group RG1 is provided between the node N0 and the node N1 in parallel to the resistor group RG0 through the switch 3.

The resistor group RG0 includes respective connection nodes N3, N5, N7, N9, and N11 of the respective resistor elements, and divided voltages can be output from the respective connection nodes N3, N5, N7, N9, and N11.

The resistor group RG1 includes respective connection nodes N4, N6, N8, N10, and N12 of the respective resistor elements and divided voltages can be output from the respective connection nodes N4, N6, N8, N10, and N12.

The switch 5 is provided between the node N1 and the ground voltage VSS. The switch 5 receives a standby signal STB2. The switch 5 operates according to the standby signal STB2. During standby, the switch 5 is not conductive according to the standby signal STB2 ("L" level). During operation, the switch 5 becomes conductive according to the standby signal STB2 ("H" level).

The switching group 2 includes a plurality of transfer gates TF2 to TF6 (hereinafter, referred to as a transfer gate TF collectively).

The transfer gate TF includes P channel MOS transistors and N channel MOS transistors provided in parallel, and an inversion signal of the input signal to the gate of the N channel MOS transistor is input to the gate of the P channel MOS transistor. In this example, it is assumed that the transfer gate TF is conductive when the input signal is at the "H" level, while it is not conductive when the input signal is at the "L" level. Specifically, when the input signal to the transfer gate TF is at the "H" level, the signal of the "H" level is input to the gate of the N channel MOS transistor and the signal of the "L" level is input to the gate of the P channel MOS transistor. According to this, the transfer gate TF becomes conductive. On the other hand, when the input signal to the transfer gate TF is at the "L" level, the signal of the "L" level is input to the gate of the N channel MOS transistor, and the signal of the "H" level is input to the gate of the P channel MOS transistor. According to this, the transfer gate TF is not conductive.

The transfer gate TF2 is provided between the connection node N3 and the connection node N4, to be able to short-circuit the respective connection nodes according to a trimming signal TRM1.

The transfer gate TF3 is provided between the connection node N5 and the connection node N6, to be able to short-circuit the respective connection nodes according to the trimming signal TRM2.

The transfer gate TF4 is provided between the connection node N7 and the connection node N8, to be able to short-circuit the respective connection nodes according to the trimming signal TRM3.

The transfer gate TF5 is provided between the connection node N9 and the connection node N10, to be able to short-circuit the respective connection nodes according to the trimming signal TRM4.

The transfer gate TF6 is provided between the connection node N11 and the connection node N12, to be able to short-circuit the respective connection nodes according to the trimming signal TRM5.

The transfer gates TF2 to TF6 respectively short-circuit the connection nodes having the same dividing ratio in the first voltage dividing path of the resistor group RG0 and in the second voltage dividing path of the resistor group RG1.

The switching group 4 includes a plurality of transfer gates TF7 to TF11.

The transfer gate TF7 is provided between the negative feedback node N2 and the connection node N3. The transfer gate TF7 couples the negative feedback node N2 and the connection node N3 according to the trimming signal TRM6.

The transfer gate TF8 is provided between the negative feedback node N2 and the connection node N5 in parallel to the transfer gate TF7. The transfer gate TF8 couples the negative feedback node N2 and the connection node N5 according to the trimming signal TRM7.

The transfer gate TF9 is provided between the negative feedback node N2 and the connection node N7 in parallel to the transfer gate TF8. The transfer gate TF8 couples the negative feedback node N2 and the connection node N7 according to the trimming signal TRM8.

The transfer gate TF10 is provided between the negative feedback node N2 and the connection node N9 in parallel to the transfer gate TF9. The transfer gate TF9 couples the negative feedback node N2 and the connection node N9 according to the trimming signal TRM9.

The transfer gate TF11 is provided between the negative feedback node N2 and the connection node N11 in parallel to the transfer gate TF10. The transfer gate TF11 couples the negative feedback node N2 and the connection node N11 according to the trimming signal TRM10.

The transfer gates TF7 to TF11 control the connection between the connection node of the resistor unit 1 and the negative feedback node N2, to transmit the adjusted dividing voltage to the negative feedback node N2.

Here, the transfer gate TF2 is associated with the transfer gate TF7; when the trimming signal TRM1 is set at the "H" level, the trimming signal TRM6 is also set at the "H" level. The transfer gate TF3 is associated with the transfer gate TF8; when the trimming signal TRM2 is set at the "H" level, the trimming signal TRM7 is also set at the "H" level. The transfer gate TF4 is associated with the transfer gate TF9; when the trimming signal TRM3 is set at the "H" level, the trimming signal TRM8 is also set at the "H" level.

The transfer gate TF5 is associated with the transfer gate TF10; when the trimming signal TRM4 is set at the "H" level, the trimming signal TRM9 is also set at the "H" level. The transfer gate TF6 is associated with the transfer gate TF11; when the trimming signal TRM5 is set at the "H" level, the trimming signal TRM10 is also set at the "H" level.

A standby setting circuit 6A is provided in correspondence with the node N0.

The standby setting circuit 6A includes the transfer gate TF1 between the power voltage VDD2 and the node N0 and operates according to the standby signal STB1.

A standby setting circuit 6B is provided in correspondence with the negative feedback node N2.

The standby setting circuit 6B includes the transfer gate TF0 between the power voltage VDD2 and the negative feedback node N2 and operates according to the standby signal STB1.

During standby, the standby setting circuits 6A and 6B are in an active state according to the standby signal STB1 ("H" level). In short, the power voltage VDD2 is coupled to the node N0. Further, the power voltage VDD2 is coupled to the negative feedback node N2.

During operation, the standby setting circuits 6A and 6B are in an inactive state according to the standby signal STB1 ("L" level).

Figure 3:
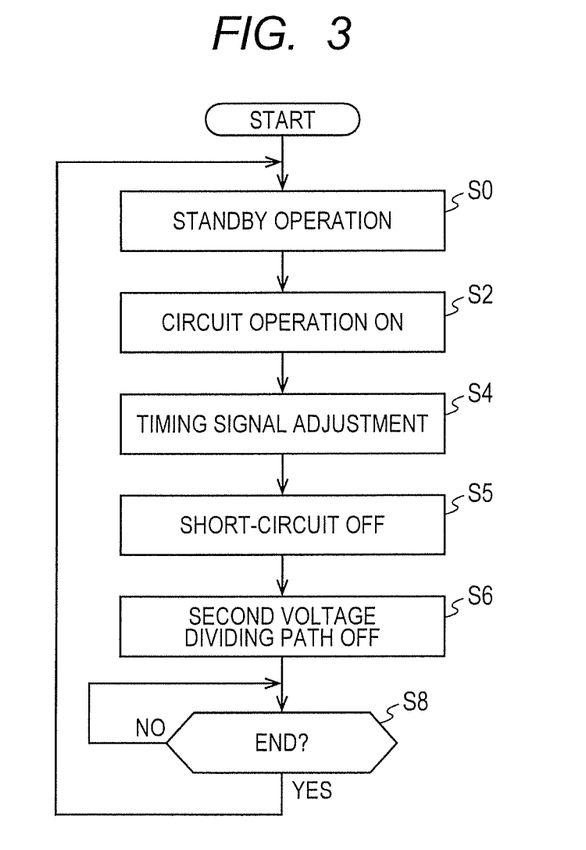
FIG. 3 is a flow chart for use in describing an operation of the regulator circuit 100 according to the first embodiment.

FIG. 3 is a flow chart for use in describing the operation of the regulator circuit 100 according to the first embodiment.

As illustrated in FIG. 3, the regulator circuit 100 performs the standby operation (Step S0). Specifically, standby signals STB1 ("H" level) and STB2 ("L" level) are input from a controller not illustrated to the regulator circuit 100. According to this, the standby setting circuits 6A and 6B are in the active state. The negative feedback nodes N2 and the node N0 are coupled to the respective power voltages VDD2. The switch 5 is in a non-conductive state. In this case, the current path is shut down. The controller sets some of the trimming signals TRM6 to TRM10 at the "H" level. Further, the controller sets some of the trimming signals TRM1 to TRM5 at the "H" level. According to the trimming signal TRM, the transfer gate TF of the corresponding switching group 2 or 4 becomes conductive. The connection node is short-circuited according to the conduction of the transfer gate TF in the switching group 2. Further, the transfer gate TF of the corresponding switching group 4 becomes conductive according to the trimming signal TRM. The conductive connection node is electrically coupled to the negative feedback node N2 and the dividing voltage of a predetermined dividing ratio is input to the amplifier 50.

The trimming signal TRM is previously set at some dividing voltage fixed based on the dividing ratio of the trimming signal TRM according to a test with consideration of the element dispersion in a semiconductor device. For example, when the output voltage as the result of a test after the regulator circuit designed is near the initial value, the trimming signal set in the initial state is used. On the other hand, when it is deviated from the initial value, the output voltage is adjusted to the trimming signal for outputting the initial value. The adjusted trimming signal information is set in a register (not illustrated). In this example, the case of setting the trimming signal TRM previously according to the information set in the register is described; alternatively, the trimming signal TRM may be adjusted again through a later test simulation.

The timing signal TM is set at the "H" level and according to this, the switch 3 becomes conductive.

Then, the regulator circuit 100 turns on (ON) the circuit operation (Step S2). Specifically, the standby signals STB1 ("L" level) and STB2 ("H" level) are input from the controller not illustrated to the regulator circuit 100.

According to the standby signal STB1 set at the "L" level, the standby setting circuits 6A and 6B are in the inactive state.

According to the standby signal STB2 set at the "H" level, the switch 5 becomes conductive, to form a current path.

In this case, since the current path in the first voltage dividing path and the second voltage dividing path is formed, the current amount is increased.

The potential of the negative feedback node N2 is extracted from the connection node and when it becomes the same potential as the reference voltage VREF, the above potential gets stable according to the amplifier control.

The output voltage VOUT from the node N0 becomes a stable voltage when the potential gets stable according to the amplifier control.

At this point, a speed of the output voltage VOUT transiently changing after activating the regulator circuit 100, depends on the current amount flowing through the regulator circuit 100 and the response speed of the amplifier 50.

At the activation, the current amount is increased in order to speed up the rising of the output voltage VOUT. In this example, since the current path is formed in the first voltage dividing path and the second voltage dividing path, the current amount is increased.

Next, the timing signal TM is adjusted (Step S4). Specifically, the timing signal TM is set at the "L" level. The controller, not illustrated, has a timer function and after a predetermined elapse of time from turning on (ON) the circuit operation, it sets the timing signal TM at the "L" level. The predetermined time corresponds to the period of stabilizing the output voltage VOUT according to the amplifier control. The predetermined time can be set by previously measuring it through the simulation.

Further, the short-circuit path is turned OFF (Step S5). Specifically, all the trimming signals TRM1 to TRM5 of short-circuiting the connection nodes are set at the "L" level. According to this, all the transfer gates TF2 to TF6 are turned OFF. Accordingly, the short-circuit path being conductive is set to in a non-conductive state. Here, although the case of adjusting the timing signal TM and simultaneously turning OFF the short-circuit will be described, the short-circuit may be turned OFF before adjusting the timing signal TM.

By adjusting the timing signal TM (=set at the "L" level), the switch 3 becomes non-conductive. Then, the second voltage dividing path is turned OFF (Step S6). In other words, the current path having a large current amount is shut down.

Whether the operation of the regulator circuit 100 is finished or not is checked (Step S8), the above state is kept until it is finished; when the above operation is finished (YES in Step S8), the processing is returned to Step S0. The processing thereafter is the same. The case of finishing the operation is the case of inputting the standby signals STB1 ("H" level) and STB2 ("L" level) from the controller to the regulator circuit 100.

In this example, after the output voltage VOUT is in a stable state, the current is narrowed by shutting down the second voltage dividing path. According to this, the power consumption on the whole circuit can be reduced.

The transfer gate TF in the switching group 2 short-circuits the first voltage dividing path and the second voltage dividing path with the same dividing ratio, which makes it possible to suppress the propagation of a switchover noise to the negative feedback node N2 occurring upon the switchover of the number of the voltage dividing paths.

By increasing the operation current of the amplifier 50, a responsibility of the negative feedback can be improved, overshoot or undershoot of the output voltage VOUT is reduced during circuit activation, and the time taken to stabilize the output voltage VOUT in the circuit activation can be reduced.

During standby, the current consumption on the whole circuit can be suppressed.

Second Embodiment

Figure 4:
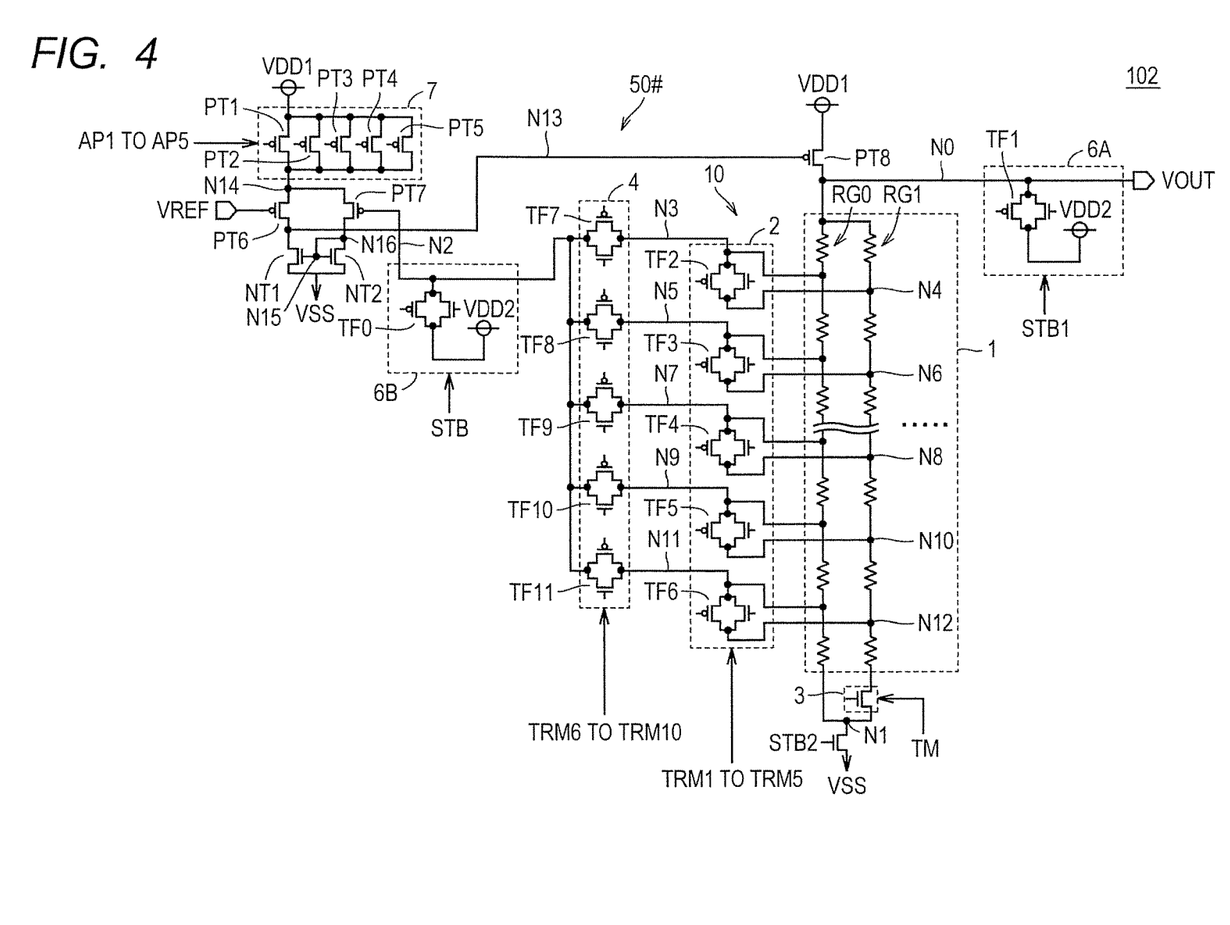
FIG. 4 is a view for use in describing a circuit structure of a regulator circuit 102 according to a second embodiment.

FIG. 4 is a view for use in describing a circuit structure of a regulator circuit 102 according to a second embodiment.

As illustrated in FIG. 4, the regulator circuit 102 is different from the regulator circuit 100 having been described in FIG. 1 in that the amplifier 50 is replaced with an amplifier 50#.

The other structure is the same as described in FIG. 1; their detailed description is not repeated.

The amplifier 50# includes a current adjusting unit 7 formed by the P channel MOS transistors PT1 to PT5, P channel MOS transistors PT6 to PT8, and N channel MOS transistors NT1 and NT2.

The P channel MOS transistors PT1 to PT5 are coupled between the power voltage VDD1 and the node N14 in parallel, to receive the adjustment signals AP1 to AP5 respectively.

The P channel MOS transistor PT6 is provided between the node N14 and the node N13 and its gate receives the reference voltage VREF. The N channel MOS transistor NT1 is provided between the node N13 and the node N15 and its gate is coupled to the node N16. The node N15 is coupled to the ground voltage VSS.

The N channel MOS transistor NT2 is provided between the node N15 and the node N16 and its gate is coupled to the node N16.

The P channel MOS transistor PT7 is provided between the node N14 and the node N16 and its gate is coupled to the negative feedback node N2.

The P channel MOS transistor PT8 is provided between the power voltage VDD1 and the node N0, and its gate is coupled to the node N13.

The current adjusting unit 7 adjusts the operation current amount according to the adjustment signals AP1 to AP5. When all the adjustment signals AP1 to AP5 are at the "L" level, the operation current gets larger. Further, of the adjustment signals AP1 to AP5, according as the number of the adjustment signals with the "L" level is reduced, the operation current becomes smaller.

In order to make the operation current the minimum, only the adjustment signal AP1 may be set at the "L" level.

The amplifier 50# forms a differential amplifier and by comparison between the reference voltage VREF and the voltage of the negative feedback node N2, the voltage depending on the comparison is output to the node N13 coupled to the gate of the P channel MOS transistor PT8. According to this, the amplified voltage is output as the output voltage VOUT.

In the second embodiment, at the activation time, the current amount is increased in order to speed up the rising of the output voltage VOUT. In this example, the current path is formed in the first voltage dividing path and in the second voltage dividing path; and therefore, the current amount is increased. Together with this, all the adjustment signals AP1 to AP5 are set at the "L" level. According to this, the operation current amount of the amplifier 50# increases, hence to make it possible to speed up the response of the amplifier 50#. After the output voltage VOUT is in the stable state, the second voltage dividing path is shut down according to the timing signal TM and the adjustment signals AP2 to AP5 are set at the "H" level. Specifically, the operation current amount of the amplifier 50# is narrowed. According to this, the operation current in the amplifier 50# is reduced and the current consumption amount can be reduced.

Figure 5:
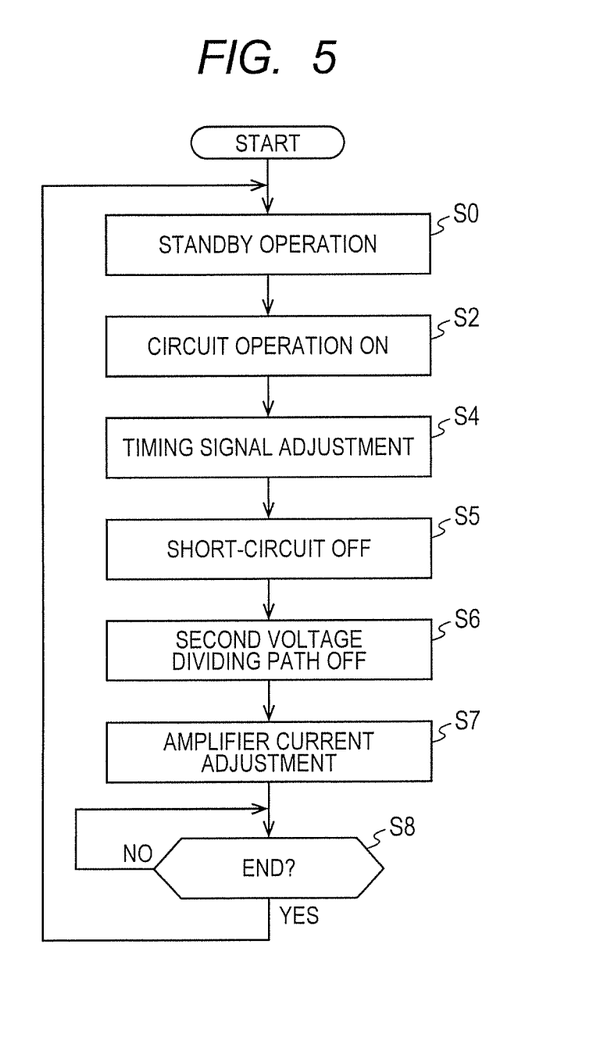
FIG. 5 is a flow chart for use in describing an operation of the regulator circuit 102 according to the second embodiment.

FIG. 5 is a flow chart for use in describing the operation of the regulator circuit 102 according to the second embodiment.

As illustrated in FIG. 5, by comparison with the flow of FIG. 3, Step S7 is further added differently from the first embodiment. The other structure is the same as in FIG. 3 and their detailed description is not repeated. Specifically, in Step S7, the second voltage dividing path is shut down according to the timing signal TM and the current of the amplifier 50# is adjusted. For example, the adjustment signals AP2 to AP5 are set at the "H" level. According to this, the current amount of the amplifier 50# is adjusted. As the result, the current consumption amount of the amplifier 50# can be reduced.

Modified Example of Second Embodiment

Figure 6:
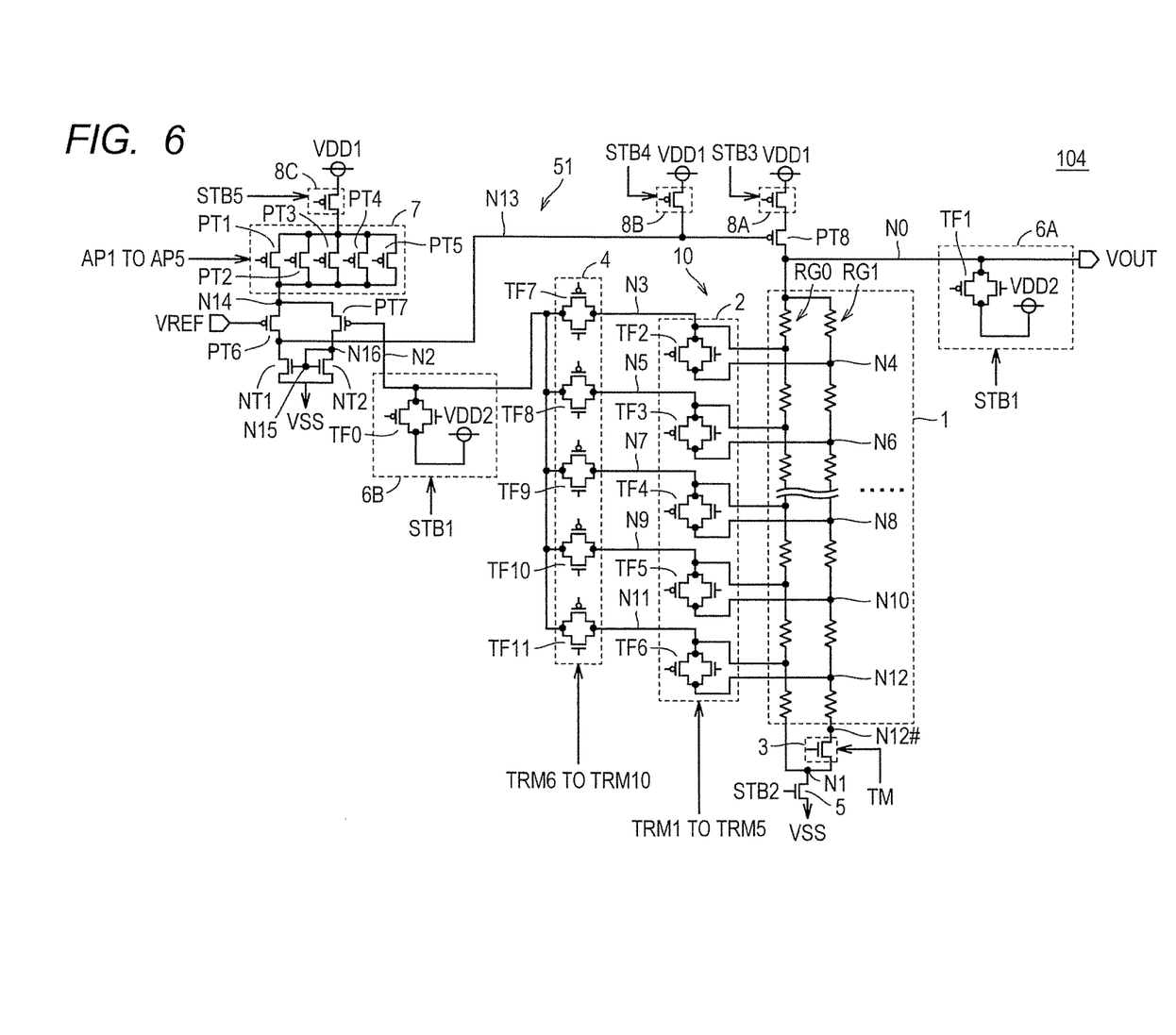
FIG. 6 is a circuit diagram of a regulator circuit 104 according to a modified example of the second embodiment.

FIG. 6 is a circuit diagram of a regulator circuit 104 according to a modified example of the second embodiment.

As illustrated in FIG. 6, the regulator circuit 104 is different from the regulator circuit 102 having been described in FIG. 4 in that the amplifier 50# is replaced with an amplifier 51. The other structure is the same as in the regulator circuit having been described in FIG. 4 and the detailed description is not repeated.

The amplifier 51 is different from the amplifier 50# in that the switches 8A to 8C are further added. The other structure is the same as that having been described in FIG. 4 and the detailed description is not repeated.

The switch 8A is a power switch provided between the P channel MOS transistor PT8 and the power voltage VDD1, to receive the standby signal STB3.

The switch 8B is a power switch provided between the power voltage VDD1 and the node N13, to receive the standby signal STB4.

The switch 8C is a power switch provided between the power voltage VDD1 and the current adjusting unit 7, to receive the standby signal STB5.

The regulator circuit includes the current adjusting unit 7 formed by the P channel MOS transistors PT1 to PT5, the P channel MOS transistors PT6 to PT8, and the N channel MOS transistors NT1 and NT2.

Figure 7:
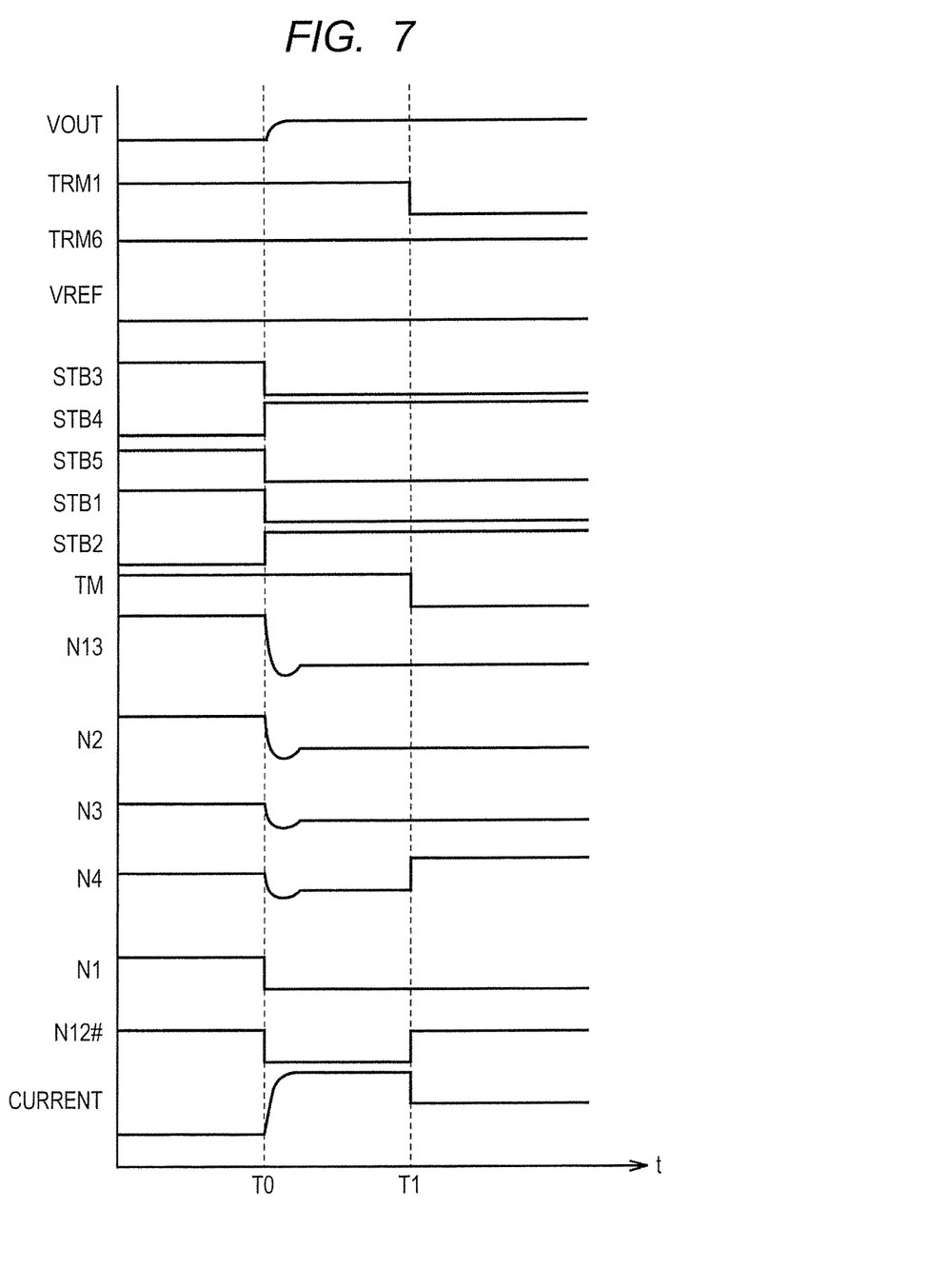
FIG. 7 is a timing chart of the regulator circuit 104 according to the modified example of the second embodiment.

FIG. 7 is a timing chart of the regulator circuit 104 according to the modified example of the second embodiment.

As illustrated in FIG. 7, in the initial state, the standby signal STB1 is set at the "H" level. Further, the standby signal STB2 is set at the "L" level. Further, the standby signals STB3 and STB5 are set at the "H" level. Further, the standby signal STB4 is set at the "L" level. Further, the timing signal TM is set at the "H" level.

Further, in this example, the trimming signals TRM1 and TRM6 are set at the "H" level. The other trimming signals are set at the "L" level.

Since the standby signal STB1 is set at the "H" level, the standby setting circuit 6A is turned on, and the output voltage VOUT is fixed at the voltage level of the power voltage VDD2. Further, the standby setting circuit 6B is turned on and the negative feedback node N2 is coupled to the power voltage VDD2 and set at the "H" level.

Since the standby signal STB2 is set at the "L" level, the switch 5 is turned off. Therefore, the current path is not formed.

Since the standby signal STB3 is set at the "H" level, the switch 8A is turned off.

Since the standby signal STB4 is set at the "L" level, the switch 8B is turned on. Therefore, the node N13 is coupled to the power voltage VDD1 and is set at the "H" level.

Since the standby signal STB5 is set at the "H" level, the switch 8C is turned off.

The trimming signals TRM1 and TRM6 are set at the "H" level, hence to make the transfer gate TF of the switching groups 2 and 4 conductive. The negative feedback node N2 is electrically coupled to the connection node N3. The connection node N3 is electrically coupled to the connection node N4.

At the time T0, when the circuit operation is turned on (ON), the standby signal STB1 is set at the "L" level. The standby signal STB2 is set at the "H" level. The standby signals STB3 and STB5 are set at the "L" level. The standby signal STB4 is set at the "H" level. The timing signal TM is kept in the "H" level.

According to the standby signal STB1 being set at the "L" level, the standby setting circuits 6A and 6B are in an inactive state. Further, according to the standby signal STB2 being set at the "H" level, the switch 5 becomes conductive, to form the current path.

In this case, since the current path is formed in the first voltage dividing path and in the second voltage dividing path, the current amount increases.

When the potential of the negative feedback node N2 is extracted from the connection node to be at the same potential as the reference voltage VREF, it becomes stable according to the amplifier control. When it is stabilized by the amplifier control, the output voltage VOUT also becomes a stable voltage.

From this point of view, the transiently-changing speed of the output voltage VOUT depends on the current amount flowing through the regulator circuit 100 and the response speed of the amplifier 51.

At the activation time, the current amount is increased in order to speed up the rising of the output voltage VOUT. In this example, the current path is formed in the first voltage dividing path and in the second voltage dividing path, hence to increase the current amount.

Next, at the time T1, the timing signal TM is adjusted. Specifically, the timing signal TM is set at the "L" level. According to this, the switch 3 becomes non-conductive. The second voltage dividing path is turned OFF. In short, the current path having a larger current amount is shut down. According to this, the current is narrowed.

Further, the trimming signal TRM1 is set at the "L" level. According to this, the short-circuit path of the connection nodes N3 and N4 is turned OFF. The potential of the connection node N4 rises.

Further, the potential of the node N12# on the side of the drain of the switch 3 rises.

In this example, after the output voltage VOUT is in the stable state, the current is narrowed by shutting down the second voltage dividing path. According to this, the power consumption on the whole circuit can be reduced.

Further, the transfer gate TF in the switching group 2 short-circuits the first voltage dividing path and the second voltage dividing path with the same dividing ratio, which can suppress the propagation of a switchover noise to the negative feedback node N2 occurring when the number of the voltage dividing paths is switched.

The operation current of the amplifier 51 is increased, which can improve the responsibility of the negative feedback, reduce the overshoot or the undershoot of the output voltage VOUT in the circuit activation, and reduce the time taken to stabilize the output voltage VOUT in the circuit activation.

As set forth hereinabove, the disclosure has been specifically described based on the embodiments; however, the disclosure is not restricted to the embodiments but it is needless to say that various modifications are possible without departing from the spirit.

What is claimed is:

1. A semiconductor device comprising:
   an amplifier coupled to a power voltage, to output a voltage based on a reference voltage and a voltage of a negative feedback node, to an output node; and
   a voltage divider coupled to the output node, to output divided voltage to the negative feedback node, wherein the voltage divider includes
   first and second voltage dividing paths with different resistance,
   a first switching circuit coupled to the first and the second voltage dividing paths, in a dividing ratio adjustable way, and
   a second switching circuit for controlling the first and the second voltage dividing paths,
   wherein the voltage divider further includes a third switching circuit which couples a node with the same dividing ratio in the first and the second voltage dividing paths.

2. The device according to claim 1,
   wherein the amplifier includes a power control switch for controlling a supply of the power voltage.

3. A semiconductor device comprising:
   an amplifier coupled to a power voltage, to output a voltage based on a reference voltage and a voltage of a negative feedback node, to an output node; and
   a voltage divider coupled to the output node, to output divided voltage to the negative feedback node, wherein the voltage divider includes
   first and second voltage dividing paths with different resistance,
   a first switching circuit coupled to the first and the second voltage dividing paths, in a dividing ratio adjustable way, and
   a second switching circuit for controlling the first and the second voltage dividing paths,
   wherein the second switching circuit includes
   a first switch provided in common with the first and the second voltage dividing paths, and
   a second switch provided between the first switch and the second voltage dividing path.

4. The device according to claim 3,
   wherein the second voltage dividing path has a lower resistance than the first voltage dividing path, and
   wherein the first and the second switches are set to be conductive in an activation state and the second switch is set to be non-conductive in a stable state.

5. The device according to claim 4,
   wherein the first and the second switches are controlled according to a mode control signal for defining the activation state and the stable state.

6. The device according to claim 3, wherein the amplifier includes a power control switch for controlling a supply of the power voltage.

7. A semiconductor device comprising:
   an amplifier coupled to a power voltage, to output a voltage based on a reference voltage and a voltage of a negative feedback node, to an output node; and
   a voltage divider coupled to the output node, to output divided voltage to the negative feedback node, wherein the voltage divider includes
   first and second voltage dividing paths with different resistance,
   a first switching circuit coupled to the first and the second voltage dividing paths, in a dividing ratio adjustable way, and
   a second switching circuit for controlling the first and the second voltage dividing paths,
   wherein the amplifier includes an adjustment circuit which adjusts an operation current of the amplifier.

8. The device according to claim 7,
   wherein the adjustment circuit includes a plurality of transistors capable of adjusting a current amount of the operation current based on a number of conductive units.

9. The device according to claim 8,
   wherein, of the transistors, the number of conductive units in the activation state is more than the number of conductive units in the stable state.

10. The device according to claim 9,
    wherein the transistors are controlled according to a mode control signal for defining the activation state and the stable state.

11. The device according to claim 7, wherein the amplifier includes a power control switch for controlling a supply of the power voltage.

* * * * *